Patented Feb. 17, 1942

2,273,597

UNITED STATES PATENT OFFICE 2,273,597

METALLIC PIGMENTS AND METHOD OF PREPARING SAME

Arthur Schroder, Highland Park, Ill., assignor to The Pure Oil Company, Chicago, Ill., a corporation of Ohio No Drawing. Application November 8, 1939, Serial No. 303,364

13 Claims. (Cl. 106—290)

This invention relates to certain new and useful improvements in the preparation of pigments, particularly pigments having a metallic luster and has for one of its objects to provide a simple process for producing pigments in the finest possible comminuted state, thereby effecting a uniform, finely divided product capable of covering a relatively large surface when used in suitable vehicles such as drying oils, nitro-cellulose solutions and other well known paint vehicles.

It has now been ascertained in accordance with this invention that finely divided pigments having a metallic luster may be easily and economically prepared by decomposing certain metal salts of organic acids by heating the aforesaid compounds to suitable temperatures. These compounds may be dissolved or dispersed in a suitable menstruum prior to decomposition in order that the metallic pigment precipitated as a result of the thermal decomposition of the compound will be in a more finely divided state. Copper salts of higher molecular weight fatty acids such as oleic and stearic as well as copper linoleate, resinate and particularly copper naphthenate have been found suitable for this purpose.

In one example copper naphthenate was heated to approximately 550° F. and a metallic-like precipitate having a bright, coppery luster obtained. The precipitate was allowed to settle, the decomposed naphthenate decanted and the precipitate washed with solvent naphtha, centrifuged, the solvent naphtha decanted, the precipitate dried and a bright metallic pigment entirely free from naphtha and decomposed naphthenate obtained. This metallic-like, finely divided residue was then suspended in a solution of Celluloid in acetone and alcohol and was used as a lacquer. The resulting film had a bright metallic luster and a coppery sheen similar to high grade copper lacquers that are known in commerce.

Dissolving metal salts of organic acids in suitable solvents such as high boiling petroleum fractions, prior to the decomposition, aids in obtaining a more finely divided precipitate and in the ease with which the precipitate may be separated from other products of the decomposition as well as any undecomposed material. The liquor selected as a menstruum should have a decomposition temperature above that of the compound selected in order to avoid decomposition of the menstruum. The presence of an alkali such as the hydroxide, carbonate or bicarbonate of sodium or potassium facilitates the decomposition of the metal salts and permits decomposition at lower temperatures. The alkali used should be one that does not substantially decompose at the decomposition temperature of the metal salt. The temperature required to decompose the various metal salts varies with the particular salt under consideration. Temperatures of 250° F. to 650° F. may be used and generally temperatures of 500° F. to 600° F. are preferred since precipitates obtained from heating within this range appear to be of higher quality than those obtained as a result of higher decomposition temperatures and at the same time unnecessary decomposition of the organic radical is avoided. Lower decomposition temperatures increase the time of production. Organic acid formed as a decomposition product may be again used by first reacting the acid with an appropriate metal salt such as copper carbonate, thereby forming the copper salt of the organic acid, which may be decomposed as previously described. If an alkali is present, the optimum decomposition temperature is appreciably lowered, the amount depending upon various factors such as the amount of such compound present and the particular metal salt used. With alkaline reagent present, the decomposition temperature may be as much as 50° F. to 200° F. below the temperature required without the alkaline compound.

While solvent naphtha has been mentioned as a suitable aid in washing the metallic pigments, other solvents may be used for this purpose, such as carbon tetrachloride, alcohol, ether, hexane and other well known stable, organic solvents, the primary requisite being that the decomposition products, other than the metallic precipitate, be soluble in the solvent used. Although the precipitate has been referred to as a metallic-like precipitate, it is not definitely known whether this material is the metal, the oxide or a combination of the metal and oxide, or another compound of the metal. However, regardless of the exact composition, the precipitate has a metallic, lustrous sheen and is in a very finely divided condition which makes it exceedingly useful as a component of bronzes and similar metallic-like paints where a pigment with a high metallic luster is required.

Although the invention has been described with specific reference to copper naphthenate, other metallic naphthenates and other metal salts of organic acids may be used. For example, copper resinate, oleate or stearate will produce particularly satisfactory results. The invention is not restricted to the particular conditions and method of operation hereinbefore set forth, but is susceptible to modifications and changes well

I claim:

1. The method of producing copper pigments comprising thermally decomposing copper naphthenate whereby a precipitate having a metallic luster is formed.

2. Method in accordance with claim 1 where the decomposition temperature is between approximately 250° F. and 650° F.

3. Method in accordance with claim 1 where the decomposition temperature is between approximately 500° F. and 600° F.

4. Method in accordance with claim 1 where the copper naphthenate is dissolved in high boiling mineral oil prior to decomposition.

5. The method of producing copper pigments comprising adding sufficient alkali to copper naphthenate to appreciably reduce the thermal decomposition temperature thereof, heating the mixture to decomposition temperature whereby to decompose the copper naphthenate and precipitate a finely divided solid having a metallic luster.

6. Method in accordance with claim 5 where the copper naphthenate is dissolved in high boiling mineral oil prior to decomposition.

7. Method in accordance with claim 5 where the alkaline compound is sodium hydroxide.

8. Method in accordance with claim 5 where the decomposition temperature is 250° F. to 650° F.

9. The method of producing copper pigments from copper naphthenate comprising heating said naphthenate to decomposition temperatures whereby to decompose the naphthenate into a finely divided precipitate having a metallic luster and separating the precipitate.

10. The method of producing copper pigments comprising thermally decomposing one or more copper compounds selected from the group consisting of copper linoleate, stearate, oleate, resinate and naphthenate in the presence of sufficient alkali to appreciably lower the decomposition temperature.

11. The method of producing copper pigments from copper resinate comprising heating said resinate to decomposition temperatures in the presence of sufficient alkali to appreciably lower the decomposition temperature whereby to decompose the resinate into a finely divided precipitate having a metallic luster and separating the precipitate.

12. The method of producing copper pigments from copper oleate comprising heating said oleate to decomposition temperature in the presence of sufficient alkali to appreciably lower the decomposition temperature whereby to decompose the oleate into a finely divided precipitate having a metallic luster and separating the precipitate.

13. The method of producing copper pigments comprising thermally decomposing copper salts of higher molecular weight fatty acids in the presence of sufficient alkali to appreciably lower the decomposition temperature.

ARTHUR SCHRODER.